Figure 1:
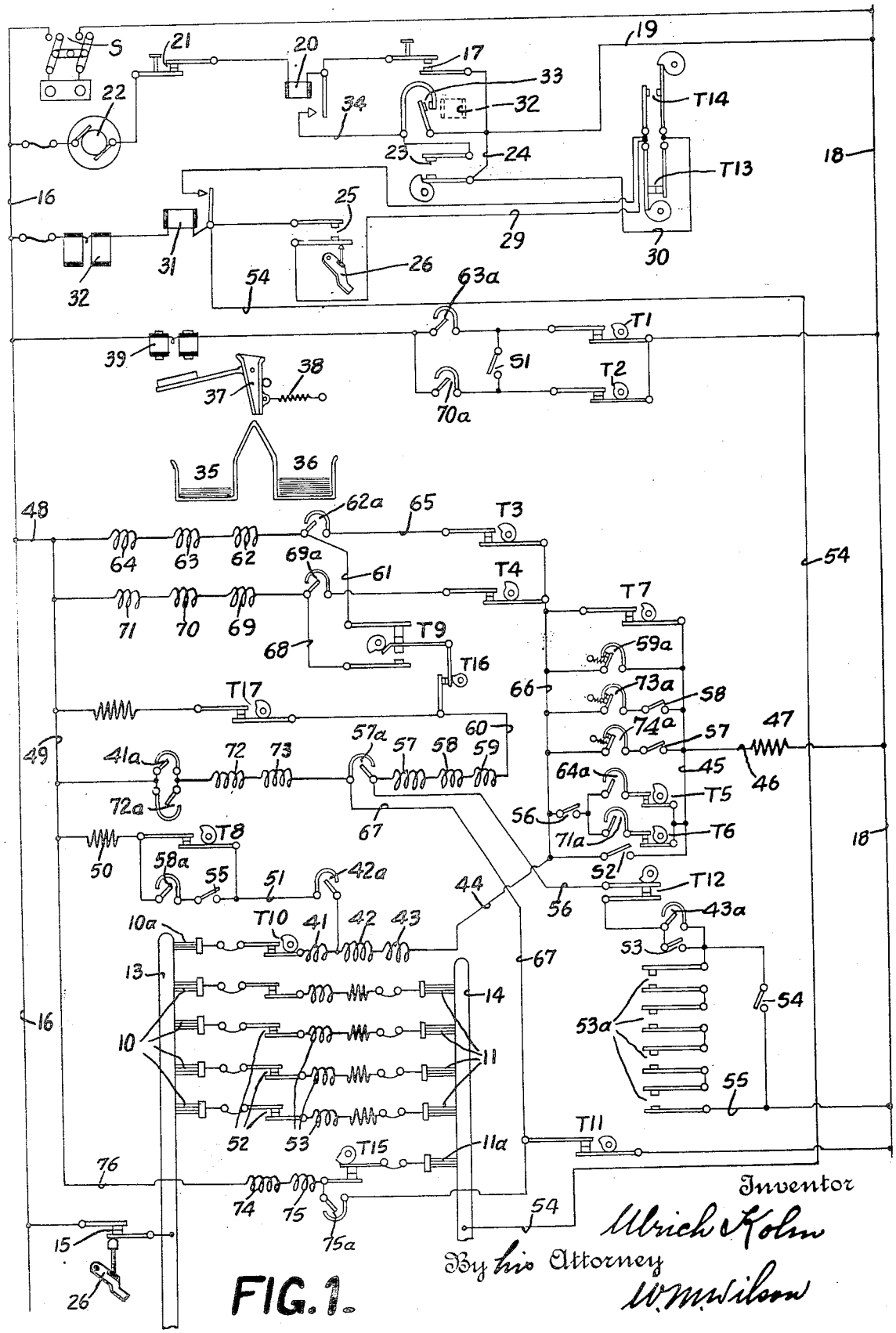

May 1, 1934.  U. KÖLM  1,957,175

CARD SORTING DEVICE

Filed Feb. 20, 1930  2 Sheets-Sheet 1

Inventor
Ulrich Kölm
By his Attorney
W. M. Wilson

May 1, 1934.  U. KÖLM  1,957,175
CARD SORTING DEVICE
Filed Feb. 20, 1930  2 Sheets-Sheet 1

INVENTOR
Ulrich Kölm
BY his ATTORNEY

Patented May 1, 1934

1,957,175

UNITED STATES PATENT OFFICE 1,957,175

CARD SORTING DEVICE

Ulrich Kölm, Berlin, Germany, assignor, by mesne assignments, to International Business Machines Corporation, New York, N. Y., a corporation of New York Application February 20, 1930, Serial No. 429,977
In Germany February 22, 1929

3 Claims. (Cl. 209—110)

The invention relates to accounting machines and more particularly to machines adapted to sort out certain groups of records from other groups of records which are arranged in sequential order. For the purpose of explanation the invention will be explained in connection with a banking system in which perforated record cards are used for accounting purposes. It will be understood, however, that the system is applicable to any other businesses in which similar problems arise and the particular example is chosen merely to visualize the operation of the system. It may be assumed that in a certain bank a method of bookkeeping is employed wherein for notes which are issued a credit card is properly perforated to indicate the obligation. As the payments on the note are made corresponding debit cards are perforated and filed with the credit cards of the same account. Other business transactions may arise involving a number of credit and debit entries before such an account balances.

It may be advantageous to mechanically separate those groups of cards in which a complete balance has been obtained from the other groups or it may be desirable to separate out such groups of cards as have a certain relationship between their credit and debit cards.

One object of the present invention is to provide a sorting machine whose purpose is to withdraw such groups of cards by means of a comparing operation. Thus groups of cards containing one or more credit cards accompanied by debit cards are separated from card groups which consist of debit cards only and groups which contain a single credit card.

According to the invention it is proposed to identify credit cards by a perforation in a predetermined index point position in a selected card column and to omit this perforation from debit cards. The cards are prearranged according to account numbers and successive cards advancing through the machine are analyzed by two analyzing elements which are spaced apart so that the index point positions of the account number perforations in both cards will be analyzed simultaneously by the elements. Further analyzing elements are provided to sense the special credit card designating perforation.

Another object of the machine is to sort groups of cards, in accordance with the relation between the credit and debit cards contained in any group.

It is a further object to provide suitable switching devices which will adapt the machine to sort out groups of cards in which the relationship between the cards comprising such groups have a certain relationship, as where it may be desired to sort out groups which contain a single debit card or groups containing a single credit card. Again it may be desired to sort out such groups as contain a credit card accompanied by one or more debit cards.

In the following table are listed the various combinations which may occur between credit and debit cards. For purposes of illustration these relationships are considered as groups in which the cards in each group have a common account number. Credit cards are indicated by the letter "C" and debit cards by the letter "d" and the numeral following the letter will indicate the group to which the card belongs.

| | |
|---|---|
| C1, d1 | First group |
| C2, d2, d2 | Second group |
| C3, C3, d3 | Third group |
| C4, C4, d4, d4 | Fourth group |
| C5, C5 | Fifth group |
| d6 | Sixth group |
| d7, d7 | Seventh group |
| C8 | Eighth group |

The cards are arranged to pass through the machine with the credit cards of each group leading, as (C1, d1,) (C2, d2, d2), (C3, C3, d3), etc.

The manipulation of certain switches will adapt the machine to separate these groups of cards in two sorting pockets in accordance with the following table.

*First sorting cycle*

| Pocket 35 | Pocket 36 |
|---|---|
| C1, d1 | d6 |
| C2, d2, d2 | d7, d7 |
| C3, C3, d3 | C8 |
| C4, C4, d4, d4 | |
| C5, C5 | |

In this sorting operation card groups containing debit cards only and single credit cards are sorted into pocket 36 and the other groups into pocket 35.

For certain reasons it may be desirable to further sub-divide the groups in pocket 36 in accordance with the following table, in which case certain other switches are manipulated and these groups passed through the machine a second time. The results obtained are illustrated in this second table.

Second sorting cycle

| Pocket 35 | Pocket 36 |
| --- | --- |
| d7, d7 | d6, C8 |

This it will be observed has divided out the single card groups from those having a plurality of debit cards only. If it is desired to further separate the cards in pocket 36, that is, to separate the single debit card groups from the single credit card groups, the manipulation of certain other switches and the re-analysis of the cards in pocket 36 will give the result in the next table.

Third sorting cycle

| Pocket 35 | Pocket 36 |
| --- | --- |
| C8 | d6 |

Thus far we have seen that the single card groups may be selected from the main file as may also be those groups having a plurality of debit cards. The cards which were in pocket 35 after the first sorting cycle, namely the cards of the first to the fifth groups, may be further subdivided into groups in accordance with the next table in which those cards having a single credit card followed by debit cards will be assigned to pocket 35 and those having two credit cards will be assigned to pocket 36.

Fourth sorting cycle

| Pocket 35 | Pocket 36 |
| --- | --- |
| C1, d1<br>C2, d2, d2 | C3, C3, d3<br>C4, C4, d4, d4<br>C5, C5 |

Pocket 35 now contains two groups of different character which may be separated by effecting other switch shifting mechanisms.

Fifth sorting cycle

| Pocket 35 | Pocket 36 |
| --- | --- |
| C2, d2, d2 | C1, d1 |

Pocket 36 contains groups having a single credit and debit card and pocket 35 contains groups in which a single credit card is followed by two or more debit cards.

A further sorting cycle may be initiated to still further sub-divide the groups as in the following:

Sixth sorting cycle

| Pocket 35 | Pocket 36 |
| --- | --- |
| C4, C4, d4, d4 | C3, C3, d3<br>C5, C5 |

Finally a seventh sorting cycle will separate the two groups now in pocket 36.

Seventh sorting cycle

| Pocket 35 | Pocket 36 |
| --- | --- |
| C3, C3, d3 | C5, C5 |

Thus by sending the cards through the machine in these various sorting cycles the eight classes or groups illustrated may be individually selected from the general file after one or more sorting cycles. Or where it is desired merely to divide the main file into two such groups as shown in the table headed "First sorting cycle" the operation of the machine may be terminated at such point. Various operations of the machine which have been shown as extending through seven sorting cycles may, of course, be curtailed, if it is not desired to carry out the sorting of the groups to this extent.

Figure 2:
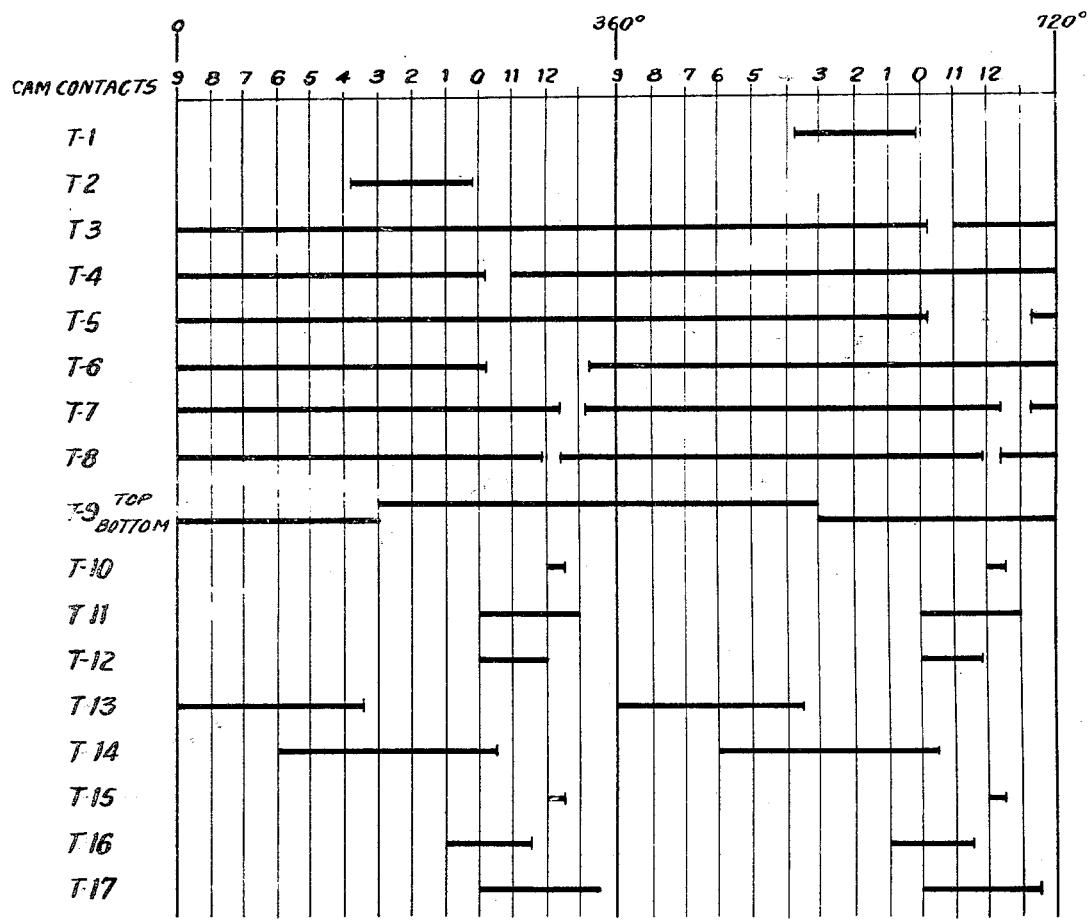

The invention is shown by way of example in the accompanying drawings to which reference should be had for a more complete explanation and in which Fig. 1 shows the invention in diagrammatic form. Fig. 2 is a diagram showing the timing of the various cam contacts in the machine.

Certain switches are provided in the machine to effect the operations necessary during the various sorting cycles. The following table will indicate the switches to be closed during the particular cycles of sorting:

| | |
| --- | --- |
| First sorting cycle | Switches S1, S2, S5 are closed. |
| Second sorting cycle | Switches S1, S2, S3 are closed. |
| Third sorting cycle | Switches S2, S4 are closed. |
| Fourth sorting cycle | Switches S1, S5, S8 are closed. |
| Fifth sorting cycle | Switches S1, S3, S6, S8 are closed. |
| Sixth sorting cycle | Switches S1, S3, S6, S8 are closed. |
| Seventh sorting cycle | Switches S1, S3, S6, S7 are closed. |

The machine illustrated is energized from a source of energy through a switch S and is provided with upper and lower brushes 10 and 11 respectively, to which the usual tabulating cards are fed successively by suitable feeding mechanism (not shown).

It may here be mentioned that for clarity in the wiring diagram it is necessary to place certain relay contacts at points remote from their controlling coils. In such case, the contacts are labelled with the reference character of the controlling coil with a lower case letter appended thereto.

The arrangement is such that each card passes beneath the lower brush 11 exactly one machine cycle later than it passes beneath the upper brush 10, that is, the brushes 11 and 10 analyze corresponding positions on successive cards simultaneously. The upper and lower brushes coact with individual contact blocks 13 and 14, the block 13 being connected to one side of the source of current through a card lever contact 15 and line 16.

To start the tabulator in operation the operator first closes line switch S to the source of supply. Thereafter start key 17 is depressed which upon closure of its contacts establishes a circuit from line 18, through wire 19, start key 17, motor relay magnet 20, stop key 21, motor 22, to opposite side of line 16. The energization of motor relay magnet 20 establishes a holding circuit for the motor 22 through the armature of relay magnet 20, wire 34, cam contacts 23, wire 24, wire 19, back to line 18. The cards now pass downwardly through the device and close the card contacts 15 and 25. The contacts 25 are actuated by card lever 26 which is of the usual conventional form and adapted to be displaced for the passage of a card.

Cam contacts T—13 and T—14 are make and break cam contacts usually employed in tabulating apparatus and serve to establish a circuit 29 and to interrupt this circuit once per card cycle. Closure of the make and break cam contacts T—13, T—14 closes a circuit from the line 18, through wires 19, 24 and 30, through contact T—13, wire 29, card lever contacts 25, relay magnet 31 and motor control relay magnet 32, back to line 16. The attraction of the armature 33 of the motor controlled relay 32 establishes another holding circuit for this motor 22, through wire 19, armature 33, wire 34, armature of relay magnet 20, stop key 21, motor 22, to line 16. This holding circuit maintains the machine in operation when cam contacts 23 break once per card cycle. The purpose of the contacts 23 is to interrupt the operation of the device upon the de-energization of motor control relay 32 after the last card has passed through the machine.

The foregoing description refers to those circuits and operations of the machine which are customary and usual in all devices of this class.

Before the cards are inserted in the machine they will have been sorted into groups in accordance with some group designating perforations. This sorting into groups is accomplished in the usual sorting machines in a manner well known in the art. The various groups may contain two kinds of cards which have a different meaning, as for instance, debit and credit cards. Hereinafter the credit cards will be designated by the letter "C" and the debit cards by the letter "d". The credit cards C in addition to the usual perforated information contained on tabulating cards will contain an additional perforation located in a particular index point position in a column set aside for the particular purpose of distinguishing this card as bearing credit information.

For ease and facility in explaining the electric circuit of the machine, it is desirable in connection therewith to consider a number of specific groups of cards previously sorted according to their group indicating perforations as in the foregoing table used in connection with the general description of the machine.

In the sorting of the cards they are so arranged that when they pass through the present machine the C cards of each group will precede the d cards. The machine is adapted to separate those groups of cards which contain credit and debit items, or credit items only from those which contain debit items only, or single credit items. Reference may be made to the foregoing table headed "First sorting cycle". To effect such separation of card groups, there are provided in addition to the analyzing brushes 10 and 11 already mentioned, brushes 10a and 11a, and two sorting pockets 35 and 36 into which the card groups are adapted to be guided in accordance with their abovementioned characteristics.

Above the pockets 35 and 36 is disposed a pivoted guide chute 37 normally held in the position shown by its spring 38 to guide the cards into the pocket 36. A magnet 39 is adapted through its armature to rock the chute 37 to divert the cards from pocket 36 to pocket 35. To separate the cards in accordance with this classification the following circuits will become effective. As the first card C1 passes under the upper sensing brushes 10 and 10a no circuit will be established through the brushes 10 since no card has yet approached the lower brushes to close the lower card lever contact 25. Consequently no circuit can be established to the common block 14. However, the additional upper brush 10a which is adapted to sense the credit card designating perforation will establish the following circuit through the card C1 now under consideration, from the line 16, through upper card lever contact 15, common block 13, brush 10a, cam contact T10 closed momentarily at this point in the cycle, thence through relay magnets 41, 42, 43, wire 44, switch S2 which is now closed, wire 45, wire 46, resistance 47, back to line 18. Thus the occurrence of the special credit designating perforation causes the energization of relay magnets 41, 42 and 43, causing the resultant shifting of their respective armatures 41a, 42a and 43a. A holding circuit now follows from line 16, wire 48, wire 49, resistance 50, cam contact T8, wire 51, contact 42a, coils 42, 43, back to line 18 as heretofore. In this manner the coils 42, 43 are kept energized until after the card has arrived at the lower brushes. In the meantime the second card d1 of the first group has arrived at the upper brushes and as both cards C1 and d1 pass their respective brushes 11 and 10 comparison of the cards is made in a manner familiar in the tabulating machine art, wherein corresponding index point positions on both cards are simultaneously sensed and a series circuit is established through such columns of the card as have identical perforations. In the present embodiment this circuit is established as follows: from line 16, through card lever contact 15 to common block 13, brushes 10, plug wire connections to contacts 52, magnets 53, plug connections to brushes 11, block 14, wire 54, lower card lever contact 25, wire 29, make and break cam contacts T13, T14, and thence back to line 18 in a familiar manner.

Contacts T13, T14 are closed while the index point positions are passing the brushes. Associated with each of the magnets 53 is a contact 53a adapted to be closed upon energization of its associated magnet. As shown there are four such contacts 53a provided and whereas the group number designation contains four places, agreement between successive cards will cause all of the contacts 53a to close. The magnets 53 and their associated contacts 53a comprise the well-known automatic group control device common in electrically controlled tabulating machines. Such a device may be of the form shown in U. S. patent to C. D. Lake. et al., 1,757,123, issued May 6, 1930. Magnets 53 and contacts 53a may be the magnets 72 and contacts 73 respectively of this patent as shown in Fig. 20. Each magnet 53 has coordinated thereto a pair of contacts 53a which upon energization of the coordinated magnets are closed and kept closed by well-known mechanical means (not shown in the drawings) until toward the end of the card cycle when they are automatically opened. The contact 43a which is closed at this time due to the above traced circuit through its control relay for magnet 43 permits the establishment upon closure of contacts 53a of a circuit as follows: from line 18 to wire 55, contacts 53a, contact 43a, cam contact T12 which is temporarily closed after the last index point position has been analyzed, wire 56, relay coils 57, 58, 59, wire 60, cam contacts T16, T9, wire 61, relay coils 62, 63, 64, wire 48, back to line 16.

Energization of the relay coil 62 closes its corresponding armature contact 62a to establish a holding circuit through coils 62, 63 and 64, from line 16, through the contacts 62a, wire 65, cam contacts T3, wire 66, switch S2 to line 18 as before. Cam contact T3 is adapted to remain closed for the duration of two machine cycles, that is, during the passage of two successive record cards. The energization of magnet 63 closes its contact 63a so that the magnet 39 may become energized through either of the cam contacts T1 or T2 since the switch S1 is closed at this time.

The timing of the cam contacts T1 and T2 is such that they alternately close for successive cards as such cards approach the chute 37. In the card group under consideration the first card C1 is conducted to the pocket 35 due to the energization of magnet 39 as just described. Due to the continued closure of the cam contact T3 the circuit switching devices set up upon the above card analysis remain unchanged and on arrival of the second card d1 at the chute 37, the magnet 39 is energized for a second time to also conduct this card into the pocket 35. As soon as magnet 39 is deenergized, its spring 38 will restore it to the position shown.

We have thus far seen how a group of cards comprising a credit card followed by a debit card was directed to the pocket 35.

Considering now the second group of cards in which the credit card C2 is followed by two debit cards d2. We shall trace the manner in which this group is also diverted into the pocked 35. The manner in which the first two cards of this group, namely C2, d2, are guided into the pocket 35 is identical with the manner in which the first group was controlled. It will therefore only be necessary to explain how the second debit card of this group is guided to the same pocket. It will be recalled that the relay magnets 57, 58 and 59 were energized during the analysis of two foregoing cards and thereby the armature contacts 58a and 57a became closed. Simultaneously a holding circuit was closed through the relay 57 in the following manner: from the line 16, wire 48, relay magnets 64, 63, 62, wire 61, cam contacts T9, T16, wire 60, magnets 59, 58, 57, contact 57a, wire 67, cam contact T11, back to line 18. A cam contact T17 is provided to maintain this holding circuit after cam contact T16 opens and until the cam contact T11 breaks the circuit. The purpose for which the magnet 58 is maintained energized is to continue the holding of the circuit through the contact 43a which would ordinarily open upon the deenergization of its controlling magnet 43. Since the second debit card d2 under consideration does not have the perforation which established the circuit through the brush 10a, the circuit through the brush 10a will now be paralleled through the contact 42a, wire 51, switch S5 now closed, contact 58a, resistance 50, wire 49, back to line 16. Relay magnet 43 therefore remains energized and its associated contacts 43a remain closed so that upon arrival of the last card of the second group at the lower sensing brushes 11 the contacts 53a which are still closed at this time cause energization of the magnet 39 to be effected in the following manner. From the line 18, wire 55, contacts 53a, contact 43a, cam contact T12, wire 56, magnets 57, 58, 59, wire 60, cam contact T16, lower blade of contact T9 which has shifted to closed position, wire 68, relay magnets 69, 70, 71, wire 48, back to line 16.

Magnets 69, 70 and 71 are similar in their functioning to the magnets 62, 63 and 64. The period of energization of the magnets 63 and 70 and the consequent duration of closure of their respective contacts 63a and 70a is controlled by the cam contacts T3 and T4, respectively, in such a manner that the contacts 63a and 70a remain closed for two card cycles.

The manner in which the third, fourth and fifth groups of cards according to the above table are directed to the pocket 35 is similar to the manner in which the groups just described are directed. All the cards of these groups are following those of the first and second into the pocket 35 since all the credit cards C cause energization of the relay 43a and the debit cards following the C cards cause the holding circuit through the contact 43a to be maintained until the leading card of the following group approaches the upper brushes.

In the case of the sixth group of cards as in the example given, there is but one card d6 which is a debit card and having no special perforation cooperating with the brush 10a cannot effect energization of the relay magnet 43 so that neither of the contacts 63a or 70a may be closed and the magnet 39 will not be energized. The conducting chute 37 will therefore remain in its normal position to conduct the cards to the pocket 36.

The seventh and eighth groups will similarly be conducted to the pocket 36. In the case of the eighth group only one credit card C8 appears although the special perforation thereon causes energization of magnet 43 and closure of its contact 43a, the absence of another card in the same group following it will fail to effect closure of the contacts 53a so that in this case the relay magnets 63 and 70 will not be energized.

The cards in pocket 36 are in groups comprising those containing debit cards only and those containing a credit card with no accompanying debit card. These groups may again be divided out into two classifications in which one may contain the single card groups, the other groups containing a number of debit cards, as in the table "Second sorting cycle". Accordingly, the cards which have already been sorted into pocket 35 are removed therefrom and the cards in pocket 36 are again passed through the machine. The switch S5 which was closed for the cycle of operation just disclosed is now opened and the switch S3 moved to closed position.

The problem specifically is to separate the seventh from the sixth and eighth groups whereby one group shall be conducted into one sorting pocket and the other groups into the other sorting pocket. The closure of the switch S3 short circuits the contact 43a so that as in the above described circuit when the contacts 53a close due to comparison between the two debit cards d7 the relay magnets 63 and 70 will be energized in a familiar manner to close a circuit through magnet 39 moving the chute 37 into a position to direct the cards into the pocket 35.

In the sixth and eighth groups there are only individual cards and since it is a preliminary condition for the energization of the magnet 63 and 70 that two simultaneously sensed cards effect closure of the contacts 53a, such energization cannot be accomplished and the cards pass through the chute 37 to the pocket 36.

In the pocket 36 we now have cards of the sixth and eighth groups which are debit and credit cards respectively. These groups may be further separated into two groups in one of which will appear only credit cards and the other only debit cards (see "Third sorting cycle" table). To this end the switches S1, S3 and S5 are opened while the switches S2 and S4 are closed.

The cards in the sixth and eighth groups are now caused to pass through the machine and upon analysis of the card d6 failure to find a perforation by the brush 10a will not affect the magnet 39 and the card will pass to the pocket 36. The following card C8, however, will in the regular manner cause closure of the contact 43a and since the switch S4 is now closed bridging the contacts 53a, energization of the relay magnets 63 and 70 may be effected. The switch S1 being open, however, will permit only one energization of the magnet 39 to be effected because the connection of the cam contact T1 with the contact 70a is interrupted. In the same manner the contact T2 is separated from the contact 63a.

The cards which were separated into the pocket 35 after the first sorting operation described, namely, cards of the first, second, third, fourth and fifth groups may again be run through the machine for further classification. This further subdivision may collect in one pocket such groups as have a single credit card followed by one or more debit cards, as for example, group 1 and group 2. The other pocket may collect groups which contain two credit cards either alone or followed by one or more debit cards in accordance with the "Fourth sorting cycle" table. For this operation the switches S1, S5 and S8 alone are closed. The circuits established in the sorting of the first and second group are the same circuits involved in the original sorting of these two groups into the pocket 35 since the only difference here is that the switch S2 is open and the switch S8 is closed and the original circuit merely travels around the switch S2 to energize the magnet 43.

As the first card C3 of the third group approaches the analyzing brush 10a, the magnet 43 as has been repeatedly explained, is energized and its associated contacts 43a are closed. As this first card approaches the lower brushes 11 and is simultaneously analyzed with the following card C3 of the same group, the associated contacts 53a are closed and one of the magnets 63 or 70 is energized. The magnets 57, 58, and 59 are also energized causing the magnet 59 to open its associated contacts 59a. Cam contact T11 controls the length of time contacts 59a may open. A contact T7 in parallel with the contacts 59a is adapted while such contacts are open to open and again close. During the period wherein the contacts 59a are open the second card C3 is analyzed by the brush 10a and the relay magnet 41 is receiving an impulse over the line 44, wire 66, cam contact T7, wire 46, resistance 47 to the line 18. Energization of this magnet 41 causes closure of its associated contacts 41a whereby the magnets 72, 73 become energized in the following manner: from line 16, wires 48, 49, contact 41a, magnets 72, 73, wire 67, cam contact T11 to line 18. This causes the contact 72a associated with the magnet 72 to close a holding circuit for the magnet 73. Energization of the magnet 73 causes it to open its associated contacts 73a which are in series with the now closed switch S8, both being normally closed. Contacts 59a and 73a are thus seen to be open during the time when cam contact T11 is closed so that when now the cam contact T7 is opened, the holding circuit through the relay magnets 63 and 70 will be interrupted, and these magnets will be deenergized. Simultaneously the holding circuit of the magnet 43 is also broken.

The deenergization of the magnets 43, 63 and 70 is necessary in this case so that the magnet 39 may not be affected by debit cards of this particular group and the cards of this group will be directed into the pocket 36. In connection with the cards of the fourth and fifth groups these same operations are effected to direct these cards to the pocket 35 also.

Up to this point cards have been fed through the machine in the successive sorting cycles with the credit card leading the group to which it belonged, with the debit cards following. To further sub-divide the groups of cards which are still combined, it will now be necessary to send the groups through the machine in reverse order, that is with the debit cards leading and the credit cards following. For instance, if it is desired to separate the cards as in the table headed "Fifth sorting cycle" the switches S1, S3, S6 and S8 are closed. As the cards advance through the machine a debit card will then, of course, be the first to reach the upper brushes. Since this card, as will be recalled, has no perforation cooperating with the brush 10a there will be no circuit established therethrough. As this first debit card passes the lower brushes the comparison between such card and the next following which is also a debit card of the same group number, will cause the contacts 53a to close in a familiar manner. The switch S3 having been closed to short circuit the relay contact 43a, current will flow from line 18 through wire 55, contacts 53a, switch S3, contact T12, wire 56 and thence through the familiar circuit which causes energization of the relay magnets 63 and 70 to effect energization of the magnet 39. The credit card now following will through the brush 10a effect the closure of contacts 43a and also energize the magnet 41 which causes its contact 41a to close which in turn, as we have seen above, causes energization of the magnets 72 and 73, but as we have also seen, such energization of the magnet 73 together with the energization of magnet 59 opens their respective contacts 73a and 59a. Provision is made to prevent the interruption of the circuit by these contacts as before, through the closing of contacts 64a and 71a associated with the magnets 64 and 71. These contacts form a shunt across the contacts 59a and 73a as well as the cam contact T7 through the cam contacts T5 and T6 which are closed for approximately two cycles of the machine, the time of closing alternating between the two contacts so that T5 is closed for one cycle and T6 for the next and so on. This shunting of the circuit maintains the magnets 63 and 70 energized so that this last card of the group may be conducted into pocket 35.

As the card group to be conducted into the pocket 36 has but one debit card followed by a credit card the circuit established through the relay magnets 63 and 70 becoming closed is ineffective since simultaneously magnet 41 is energized together with the magnet 73 which causes opening of the contact 73a and since the contact 59a is also opened when the cam contact T7 is opening before the contacts T5 and T6 close the holding circuit for the magnets 63 and 70 is interrupted and consequently the chute shifting magnet 39 will receive no current. This group of cards consequently passes through the pocket 36.

To effect the operation as listed under the sixth sorting cycle, the switches S1, S3, S6 and S8 are closed and the cards are again sent through the machine in reverse order. Upon inspection of the table of switches to be closed during the various cycles, it will be noted that the same switches are closed for both the fifth and sixth sorting cycles and inspection of the sorting cycle tables will indicate that the groups sorted during the fifth and sixth sorting cycles are very similar. For instance, during the fifth sorting cycle a group comprising two debit cards and one credit card is sorted into pocket 35 while in the sixth sorting cycle a group comprising two debit cards followed by two credit cards is sorted into pocket 35. The circuits and the timing involved are the same in both cycles. In the sixth cycle the additional credit card merely serves to prolong the holding circuit until such credit card has also entered pocket 35. Similarly, in respect to the groups to be relegated to pocket 36 the same conditions exist to prevent the energization of magnet 39, namely, the early presentation of a credit card renders the sorting and holding circuits for magnet 39 ineffective.

To effect the operations as listed under the seventh sorting cycle, the switches S1, S3, S6 and S7 are closed. For this operation the analyzing brush 11a will become effective. In the circuit to this brush are the relay magnets 74 and 75 of which the magnet 75 is adapted to close contacts 75a to establish a holding circuit for the magnet 74. The cam contact T15 similar to the cam contact T10 is adapted to supply current to the brush 11a at the instant the special credit card designating hole appears in analyzing position. The cards are again passed through the machine in reverse sequence whereby the first card d3 is analyzed. The C3 card following causes closure of the contacts 53a in the usual way. The last card of this group being likewise a credit card will be at the upper brushes when the following circuit takes place through the credit card at the lower brushes. From the line 16, wire 48, wire 49, wire 76, magnets 74, 75, cam contact T15, brush 11a, block 14, wire 54, card lever contact 25, wire 29 to the cam contacts T14, T13, thence back to line 18, through wires 24 and 19. This causes closure of the holding contact 75a and the circuit is maintained from the magnet 75 through this contact to the cam contact T11 and thence to line 18. The magnet 74 has associated therewith a normally closed contact 74a which is adapted to be opened upon energization of the magnet.

The opening of contact 74a during the passage of the last card C3 causes the interruption of the holding circuit to the magnets 63 and 70 when the relay contact 70a opens but as has been explained in connection with previous sorting cycles, the maintained energization of the magnets 64 and 71 holds the contacts 64a and 71a closed thereby bridging the opened contact 74a. Thus the cards C3 and d3 wil be conducted to the pocket 35.

The cards of group 5 will be conducted into the pocket 36 since no controlling circuits are established as the first card of this group passes the upper brushes. The advance of the second credit card to the upper brushes causes closure of the contacts 53a and also energization of the magnets 74, 75 which opens the contact 74a to interrupt the holding circuit to the magnets 63 and 70 before it can be shunted by the contacts 64a and 71a.

Upon inspection of the tables which show the selection of the card groups in the various sorting cycles, it is apparent that by a proper selection of switches S1 to S8 a particular class of card groups having certain relation existing between credit cards and debit cards may be sorted from the main file without going through all the sorting cycles herein described. For instance, referring to the first-mentioned table wherein the eight distinct types of groups are illustrated, if it is desired to sort out from such a promiscuous arrangement of groups, say, the second group which is characterized by the presence of a single credit card accompanied by two or more debit cards, to separate this group from the rest, the machine is adapted to be sent through a first sorting cycle as described, then through a cycle as explained in connection with the fourth sorting cycle wherein it is sorted out together with the groups of the type illustrated in the first group, and thirdly, a cycle, such as the fifth cycle, is initiated wherein by reference to the table heretofore mentioned the cards of the second group are separated from those of the first and the sequence of operations may terminate.

I claim:

1. In a record controlled machine, means for analyzing successive cards concurrently, means responsive upon agreement in concurrent analysis of said successive cards to prepare an electric circuit for controlling a subsequent operation of the machine, further analyzing means for analyzing cards singly and means controlled by said further analyzing means to complete said circuit.

2. In a record controlled machine, means for analyzing successive records for agreement as to group designation, means operative upon agreement in said analysis comprising switching devices cooperating with said analyzing means to establish controlling circuits for subsequent operations, further analyzing means and means controlled by the last named means to render ineffective said controlling circuits.

3. In a record controlled machine, means for analyzing successive records for agreement as to group designation, means operative upon agreement in said analysis comprising switching devices cooperating with said analyzing means to establish controlling circuits or subsequent operations, a sorting magnet controlled by said circuits, further analyzing means and means controlled by the last named means to render ineffective said controlling circuits for controlling the operation of said magnet.

ULRICH KÖLM.